(12) United States Patent
Sakurai et al.

(10) Patent No.: US 10,686,323 B2
(45) Date of Patent: Jun. 16, 2020

(54) CHARGE/DISCHARGE CONTROL CIRCUIT AND BATTERY DEVICE INCLUDING THE SAME

(71) Applicant: SII Semiconductor Corporation, Chiba-shi, Chiba (JP)

(72) Inventors: Atsushi Sakurai, Chiba (JP); Takashi Ono, Chiba (JP)

(73) Assignee: ABLIC INC., Chiba (JP)

( * ) Notice: Subject to any disclaimer, the term of this patent is extended or adjusted under 35 U.S.C. 154(b) by 535 days.

(21) Appl. No.: 15/689,520

(22) Filed: Aug. 29, 2017

(65) Prior Publication Data

US 2018/0062410 A1    Mar. 1, 2018

(30) Foreign Application Priority Data

Aug. 30, 2016   (JP) .................................. 2016-168284
Jun. 29, 2017   (JP) .................................. 2017-127519

(51) Int. Cl.
*H02J 7/00*   (2006.01)
*H02J 7/34*   (2006.01)

(52) U.S. Cl.
CPC ...... *H02J 7/007184* (2020.01); *H02J 7/0029* (2013.01); *H02J 7/0068* (2013.01); *H02J 7/342* (2020.01); *H02J 7/007* (2013.01); *H02J 7/0031* (2013.01); *H02J 7/0032* (2013.01); *H02J 7/0036* (2013.01); *H02J 7/00302* (2020.01); *H02J 7/00304* (2020.01); *H02J 7/00306* (2020.01); *H02J 7/00308* (2020.01); *H02J 7/00309* (2020.01); *H02J 7/00712* (2020.01); *H02J 7/007182* (2020.01); *H02J 7/007186* (2020.01); *H02J 7/007194* (2020.01)

(58) Field of Classification Search
CPC ..... H02J 7/0029; H02J 7/00302–00309; H02J 7/0031; H02J 7/0036; H02J 7/007182–007194
USPC ......................................... 320/134, 135, 136
See application file for complete search history.

(56) References Cited

U.S. PATENT DOCUMENTS 5,977,756 A  * 11/1999  Nagata ................. H03K 17/063
                                                             323/282
2002/0024045 A1* 2/2002  Hayashida .......... H01L 27/0288
                                                             257/48
(Continued)

FOREIGN PATENT DOCUMENTS

JP          2005-168159 A       6/2005

*Primary Examiner* — David V Henze-Gongola
*Assistant Examiner* — Tarikh Kanem Rankine
(74) *Attorney, Agent, or Firm* — Brinks Gilson & Lione (57) ABSTRACT

Provided are a charge/discharge control circuit capable of using an FET having a low withstand voltage. The charge/discharge control circuit is configured to control charging and discharging of a secondary cell, and includes: a positive power supply terminal and a negative power supply terminal for monitoring a voltage of the secondary cell; a charge control terminal configured to connect to a gate of a charge control FET, the charge control FET having one end connected to an external negative terminal to which a negative electrode of a load or a charger is connected; and a clamp circuit configured to clamp a signal at a high level for turning on the charge control FET to a voltage that is higher than a reference voltage by a predetermined voltage, the reference voltage being a voltage at the external negative terminal, the signal being output to the charge control terminal.

32 Claims, 8 Drawing Sheets

(56) References Cited

U.S. PATENT DOCUMENTS

| | | | | |
|---|---|---|---|---|
| 2003/0132732 A1* | 7/2003 | Thomas | ............... | H02J 7/0031 |
| | | | | 320/134 |
| 2003/0146738 A1* | 8/2003 | Kawagoe | ............. | H02J 7/0031 |
| | | | | 320/134 |
| 2010/0060084 A1* | 3/2010 | Tange | ................ | H02J 7/0031 |
| | | | | 307/130 |
| 2012/0249116 A1* | 10/2012 | Gagne | ................... | H02H 9/046 |
| | | | | 323/313 |
| 2013/0099755 A1* | 4/2013 | Lei | ......................... | H02H 7/18 |
| | | | | 320/134 |
| 2014/0167702 A1* | 6/2014 | Sakurai | ............... | H02J 7/0029 |
| | | | | 320/134 |
| 2015/0069957 A1* | 3/2015 | Chang | ..................... | H02J 7/00 |
| | | | | 320/107 |
| 2015/0222262 A1* | 8/2015 | Hanamura | ............. | B60L 50/51 |
| | | | | 327/109 |
| 2015/0280416 A1* | 10/2015 | Kreuter | ............ | H03K 17/0826 |
| | | | | 361/55 |
| 2016/0315494 A1* | 10/2016 | Maetani | ............... | H02J 7/0029 |
| 2016/0322840 A1* | 11/2016 | Maetani | ............... | H02J 7/0031 |

* cited by examiner

FIG. 8
RELATED ART

CHARGE/DISCHARGE CONTROL CIRCUIT AND BATTERY DEVICE INCLUDING THE SAME

RELATED APPLICATIONS

This application claims priority under 35 U.S.C. § 119 to Japanese Patent Applications No. 2016-168284 filed on Aug. 30, 2016 and No. 2017-127519 filed on Jun. 29, 2017, the entire content of which are hereby incorporated by reference.

BACKGROUND OF THE INVENTION

1. Field of the Invention

The present invention relates to a charge/discharge control circuit and a battery device including the charge/discharge control circuit.

2. Description of the Related Art

A battery device generally includes a charge/discharge control devices including a charge/discharge control circuit configured to detect overcharge, overdischarge, discharge overcurrent, and charge overcurrent, to thereby control charging and discharging. The battery device is configured to protect a secondary cell with the charge/discharge control devices (for example, see Japanese Patent Application Laid-open No. 2005-168159).

Meanwhile, a battery device including two charge/discharge control devices has been used recently. A related-art battery device 50 including two charge/discharge control devices is illustrated in the block diagram of FIG. 8.

Figure 8:
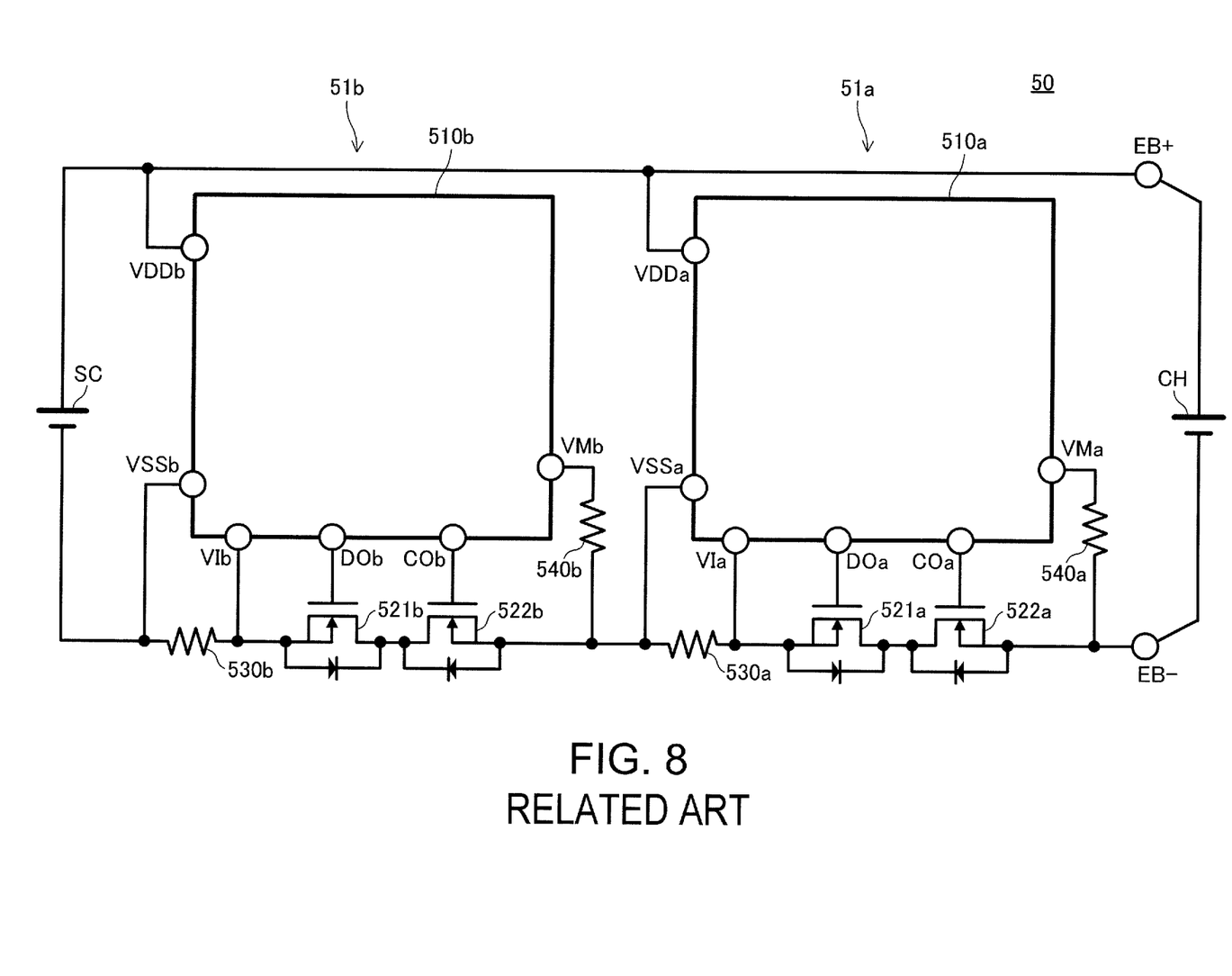
FIG. 8 is a block diagram for illustrating a related-art battery device.

The battery device 50 includes a secondary cell SC, first and second charge/discharge control devices 51a and 51b that are connected to the secondary cell SC and have the same configuration each other, an external positive terminal EB+, and an external negative terminal EB−. A charger CH is connected between the external positive terminal EB+ and the external negative terminal EB−.

The charge/discharge control device 51a (51b) includes a charge/discharge control circuit 510a (510b), a discharge control FET 521a (521b), a charge control FET 522a (522b), and resistance elements 530a (530b) and 540a (540b).

The charge/discharge control circuit 510a (510b) includes a positive power supply terminal VDDa (VDDb), a negative power supply terminal VSSa (VSSb), an overcurrent detection terminal VIa (VIb), a discharge control terminal DOa (DOb), a charge control terminal COa (Cob), and an external negative voltage input terminal VMa (VMb). The terminals are connected as illustrated in FIG. 8.

According to the battery device 50 including the two charge/discharge control devices 51a and 51b as described above, safety of the battery device 30 can be enhanced even when the first charge/discharge control device 51a fails to operate, since the second charge/discharge control device 51b operates.

Now the operation of the battery device 50 illustrated in FIG. 8 is considered in more detail.

When the second charge/discharge control device 51b detects overcharge or charge overcurrent under a state in which the charger CH is connected to the battery device 50, and the charge control FET 522b is thus turned off, a voltage of the charger CH is applied between a gate and a source of each of the discharge control FET 521a and the charge control FET 522a, which are controlled by the charge/discharge control circuit 510a (also referred to as "charger-side charge/discharge control circuit").

The voltage of the charger CH connected to the battery device 50 only needs to be a voltage that is larger than a voltage of the secondary cell SC (for example, 3.8 V), and hence chargers of various voltages may be used. Thus, a charger having a voltage (for example, 20 V) that is much larger than the voltage of the secondary cell SC is used in some cases.

As described above, the voltage of the charger CH may be applied between the gate and the source of each of the discharge control FET 521a and the charge control FET 522a, and hence the gate-source withstand voltages of the discharge control FET 521a and the charge control FET 522a need to be higher than the voltage of the charger CH.

As a result, the discharge control FET 521a and the charge control FET 522a need to be FETs having high withstand voltages, and such FETs have high ON resistance and are large in size and expensive.

SUMMARY OF THE INVENTION

In a configuration of a battery device including two charge/discharge control devices each having a discharge overcurrent cancel circuit, the present invention provides a charge/discharge control circuit which is capable of using, as a charge/discharge control FET that is controlled by a charger-side charge/discharge control circuit, an FET having a low withstand voltage instead of an FET having a high withstand voltage, and to provide a battery device including the charge/discharge control circuit.

In one embodiment, there is provided a charge/discharge control circuit configured to control charging and discharging of a secondary cell, the charge/discharge control circuit including: a positive power supply terminal and a negative power supply terminal for monitoring a voltage of the secondary cell; a charge control terminal configured to connect to a gate of a charge control FET, the charge control FET having one end connected to an external negative terminal, which is connected to a load and a negative electrode of a charger; and a first clamp circuit configured to clamp a signal at a high level for turning on the charge control FET to a voltage that is higher than a first reference voltage by a predetermined voltage, the first reference voltage being a voltage at the external negative terminal, the signal at the high level for turning on the charge control FET being output to the charge control terminal.

In one embodiment, there is provided a battery device including: a secondary cell; an external positive terminal and an external negative terminal to which a load and a charger are connected; a first charge/discharge control circuit and a second charge/discharge control circuit connected to the secondary cell; a first charge control FET having one end connected to the external negative terminal; a first discharge control FET having one end connected to the other end of the first charge control FET; a second charge control FET having one end connected to the other end of the first discharge control FET; and a second discharge control FET having one end connected to the other end of the second charge control FET and the other end connected to a negative electrode of the secondary cell, the first charge/discharge control circuit including: a positive power supply terminal and a negative power supply terminal for monitoring a voltage of the secondary cell; a charge control terminal connected to a gate of the first charge control FET; and a first clamp circuit configured to clamp a signal at a high level for turning on the charge control FET to a voltage that is higher than a first reference voltage by a predetermined voltage, the first reference voltage being a voltage at the external negative terminal, the signal at the high level for turning on the first charge control FET being output to the charge control terminal.

According to the present invention, even when a source voltage of the charge control FET that is turned on and off by an output signal from the charge control terminal becomes a voltage at the negative electrode of the charger while a signal at a high level that allows charging is being output from the charge control terminal under a state in which the negative electrode of the charger is connected to the external negative terminal, the above-mentioned signal at the high level becomes a signal clamped to a voltage that is higher than a voltage at the external negative terminal by a predetermined voltage. The above-mentioned predetermined voltage is a voltage that is applied between the gate and the source of the charge control FET. That is, when the predetermined voltage is set to a low value, an FET having a low withstand voltage can therefore be used at least as the charge control FET.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

The invention will be now described herein with reference to illustrative embodiments.

Figure 1:
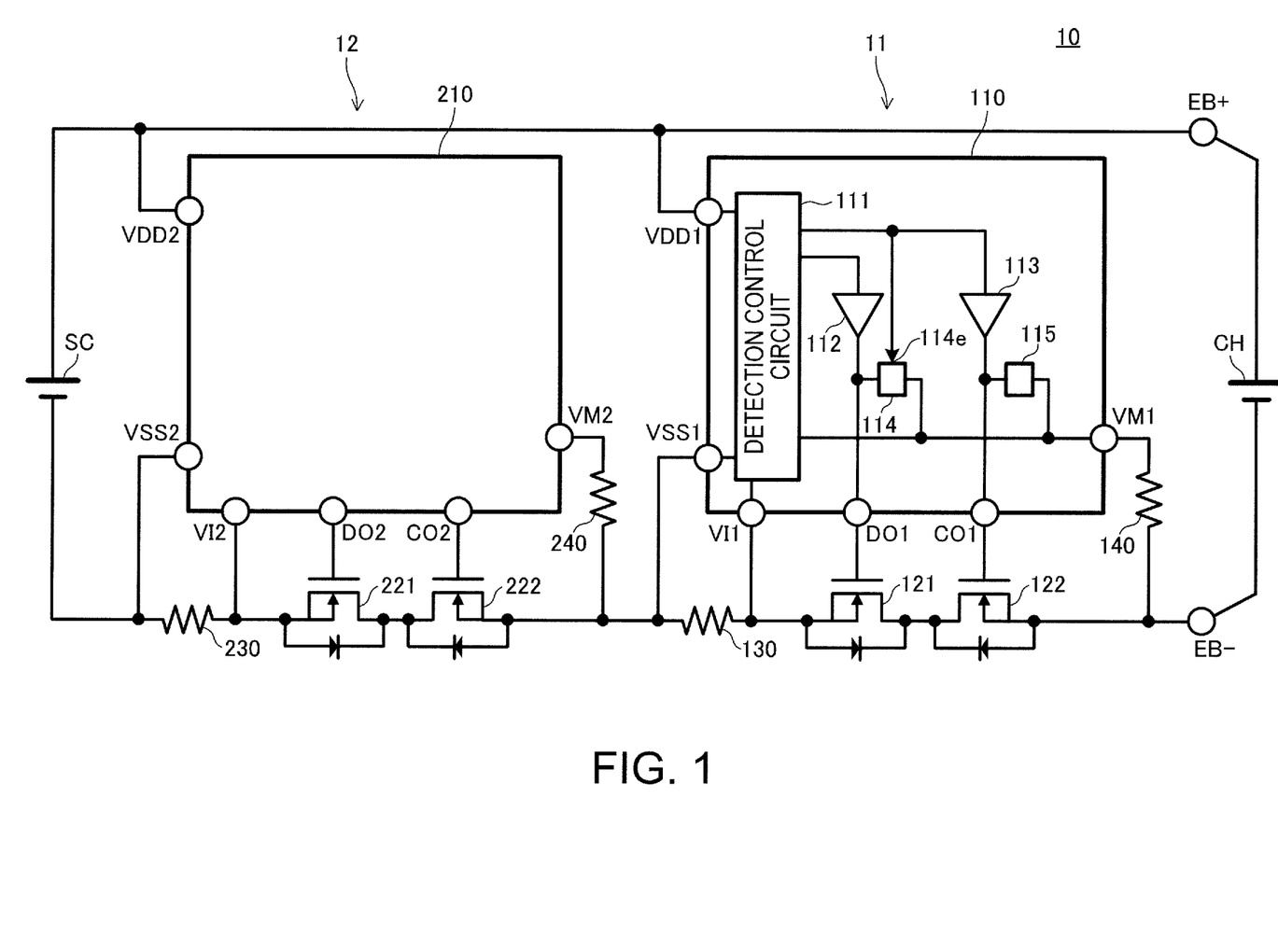
FIG. 1 is a block diagram for illustrating a battery device according to a first embodiment of the present invention.

FIG. 1 is a block diagram for illustrating a battery device 10 according to a first embodiment of the present invention.

The battery device 10 of the first embodiment includes a secondary cell SC, a first charge/discharge control device 11, a second charge/discharge control device 12, and an external positive terminal EB+ and an external negative terminal EB−. A charger CH and a load (not shown) are connected between the external positive terminal EB+ and the external negative terminal EB−.

The first charge/discharge control device 11 (also referred to as "charger-side charge/discharge control circuit") includes a first charge/discharge control circuit 110, a discharge control FET 121, a charge control FET 122, an overcurrent detection resistor 130, and a resistor 140.

The first charge/discharge control circuit 110 includes a positive power supply terminal VDD1 and a negative power supply terminal VSS1 for monitoring a voltage of the secondary cell SC, an overcurrent detection terminal VI1, a discharge control terminal DO1, a charge control terminal CO1, and an external negative voltage input terminal VM1.

The discharge control FET 121 has a gate connected to the discharge control terminal DO1, and is controlled to turn on and off by a first discharge control signal output from the discharge control terminal DO1. The charge control FET 122 has a gate connected to the charge control terminal CO1, and is controlled to turn on and off by a first charge control signal output from the charge control terminal CO1.

The second charge/discharge control device 12 includes a second charge/discharge control circuit 210, a discharge control FET 221, a charge control FET 222, an overcurrent detection resistor 230, and a resistor 240.

The second charge/discharge control circuit 210 includes a positive power supply terminal VDD2 and a negative power supply terminal VSS2 for monitoring a voltage of the secondary cell SC, an overcurrent detection terminal VI2, a discharge control terminal DO2, a charge control terminal CO2, and an external negative voltage input terminal VM2.

The discharge control FET 221 has a gate connected to the discharge control terminal DO2, and is controlled to turn on and off by a second discharge control signal output from the discharge control terminal DO2. The charge control FET 222 has a gate connected to the charge control terminal CO2, and is controlled to turn on and off by a second charge control signal output from the charge control terminal CO2.

The charge control FET 122 has one end connected to the external negative terminal EB−. The discharge control FET 121 has one end connected to the other end of the charge control FET 122. The overcurrent detection resistor 130 has one end connected to the other end of the discharge control FET 121. The charge control FET 222 has one end connected to the other end of the overcurrent detection resistor 130. The discharge control FET 221 has one end connected to the other end of the charge control FET 222. The overcurrent detection resistor 230 has one end connected to the other end of the discharge control FET 221, and the other end connected to a negative electrode of the secondary cell SC.

The positive power supply terminal VDD1 of the first charge/discharge control circuit 110 and the positive power supply terminal VDD2 of the second charge/discharge control circuit 210 are connected to a positive electrode of the secondary cell SC. The negative power supply terminal VSS1 of the first charge/discharge control circuit 110 is connected to the negative electrode of the secondary cell SC via the charge control FET 222, the discharge control FET 221, and the overcurrent detection resistor 230. The negative power supply terminal VSS2 of the second charge/discharge control circuit 210 is connected to the negative electrode of the secondary cell SC.

The external negative voltage input terminal VM1 of the first charge/discharge control circuit 110 is connected to the one end of the charge control FET 122 via the resistor 140. Further, the external negative voltage input terminal VM2 of the second charge/discharge control circuit 210 is connected to the one end of the charge control FET 222 via the resistor 240.

The first charge/discharge control circuit 110 further includes a detection control circuit 111, output drivers 112 and 113, and clamp circuits 114 and 115.

The detection control circuit 111 receives voltages at the positive power supply terminal VDD1, the negative power supply terminal VSS1, the overcurrent detection terminal VI1, and the external negative voltage input terminal VM1, as input signals. The detection control circuit 111 outputs a signal at a high level to an input terminal of the output driver 112 when allowing discharging of the secondary cell SC, and outputs a signal at a low level to the input terminal of the output driver 112 when inhibiting the discharging. Meanwhile, the detection control circuit 111 outputs a signal at the high level to an input terminal of the output driver 113 when allowing charging of the secondary cell SC, and outputs a signal at the low level to the input terminal of the output driver 113 when inhibiting the charging.

An output terminal of the output driver 112 and an output terminal of the output driver 113 are connected to the discharge control terminal DO1 and the charge control terminal CO1, respectively.

The clamp circuit 114 is connected between the discharge control terminal DO1 and the external negative voltage input terminal VM1, and the clamp circuit 115 is connected between the charge control terminal CO1 and the external negative voltage input terminal VM1. The clamp circuits 114 and 115 clamp voltages at the discharge control terminal DO1 and the charge control terminal CO1 to a voltage that is higher than a reference voltage by a predetermined voltage when voltages between the external negative voltage input terminal VM1, and the output terminal of the output driver 112 and the output terminal of the output driver 113 exceed a predetermined voltage. The reference voltage is a voltage at the external negative voltage input terminal VM1 (namely, voltage at external negative terminal EB−).

Further, the clamp circuit 114 includes an enable terminal 114e connected to the input terminal of the output driver 113.

Next, the operation of the battery device 10 is described below.

The operation to be described here is performed when the second charge/discharge control device 12 detects overcharge or charge overcurrent under a state in which the charger CH is connected between the external positive terminal EB+ and the external negative terminal EB− and the charge control FETs 122 and 222 and the discharge control FETs 121 and 221 are all in an ON state.

When the second charge/discharge control device 12 detects overcharge or charge overcurrent, the charge control FET 222 is turned off. As a result, the overcurrent detection resistor 130 is disconnected from the negative electrode of the secondary cell SC, and the voltage at the negative power supply terminal VSS1, the voltage at the overcurrent detection terminal VI1, a voltage at the node between the discharge control FET 121 and the charge control FET 122, the voltage at the external negative voltage input terminal VM1, and a voltage at the external negative terminal EB− all become a voltage at the negative electrode of the charger CH. A voltage between the positive power supply terminal VDD1 and the external negative voltage input terminal VM1 consequently becomes the voltage of the charger CH.

When the voltage between the positive power supply terminal VDD1 and the external negative voltage input terminal VM1 (namely, external negative terminal EB−) becomes a predetermined voltage (for example, 5 V) that is higher than the voltage of the secondary cell SC (for example, 3.8 V), the clamp circuits 114 and 115 operate, thereby clamping the voltages at the discharge control terminal DO1 and the charge control terminal CO1 to a voltage that is higher than the voltage at the external negative terminal EB− by a predetermined voltage (for example, 5 V), with the reference voltage being the voltage at the external negative voltage input terminal VM1 (namely, voltage at external negative terminal EB−). Thus, signals at the high level output from the discharge control terminal DO1 and the charge control terminal CO1 become the voltage clamped as described above.

As a result, between the gate and the source of each of the discharge control FET 121 and the charge control FET 122, the voltage of the charger CH is not applied. A difference voltage between the clamped voltage at the discharge control terminal DO1 and the voltage at the negative electrode of the charger CH is applied between the gate and the source of the discharge control FET 121, and a difference voltage between the clamped voltage at the discharge control terminal CO1 and the voltage at the negative electrode of the charger CH is applied between the gate and the source of the charge control FET 122. That is between the gate and the source of each of the discharge control FET 121 and the charge control FET 122, the above-mentioned predetermined voltage is applied. The predetermined voltage can be set to a sufficiently smaller value than the voltage of the charger CH (for example, 20 V).

The gate-source withstand voltages of the discharge control FET 121 and the charge control FET 122 only need to be higher than the above-mentioned predetermined voltage, and hence when the predetermined voltage is 5 V as described above, FETs having a withstand voltage of 6 V can be used as the discharge control FET 121 and the charge control FET 122, for example. There is therefore obtained an effect to eliminate the need of FETs having high withstand voltages, which have high ON resistance and are large in size and expensive.

As described above, according to the first embodiment, the safety of the battery device can be increased by providing the two charge/discharge control circuits, and FETs having low withstand voltages can be used as the discharge control FET and the charge control FET that are controlled by the charger-side charge/discharge control circuit. As a result, an inexpensive and compact battery device can be provided.

In the example of the first embodiment, the voltages at the discharge control terminal DO1 and the charge control terminal CO1 are clamped to a voltage that is higher than the reference voltage by a predetermined voltage, with the reference voltage being the voltage at the external negative voltage input terminal VM1. However, the voltage that is used as the reference voltage is not limited to voltage at the external negative voltage input terminal VM1. The reference voltage only needs to be a voltage at a terminal that takes the voltage at the negative electrode of the charger CH, namely, the voltage at the external negative terminal EB− when the charge control FET 222 is turned off, and the voltage at the overcurrent detection terminal VI1 or the negative power supply terminal VSS1 can be used as the reference voltage. Further, a terminal for receiving the voltage at the node between the discharge control FET 121 and the charge control FET 122 may be added to the first charge/discharge control circuit 110, and a voltage at the terminal may be used as the reference voltage.

In the first embodiment, as described above, the clamp circuit 114 includes the enable terminal 114e connected to the input terminal of the output driver 113. With the enable terminal 114e, between the gate and the source of the discharge control FET 121 are prevented from being applied with large voltage when at least the first charge/discharge control device 11 of the first and second charge/discharge control devices 11 and 12 detects overcharge or charge overcurrent, and the charge control FET 122 is thus turned off, under the state in which the charger CH is connected between the external positive terminal EB+ and the external negative terminal EB− and the charge control FETs 122 and 222 and the discharge control FETs 121 and 221 are all in the ON state.

Specifically, for example, when only the charge control FET 122 is turned off under the state in which the charge control FETs 122 and 222 and the discharge control FETs 121 and 221 are all in the ON state, the discharge control FET 121 is disconnected from the external negative terminal EB−. Thus, a voltage at the other end (source) of the discharge control FET 121 becomes the same voltage as the voltage at the negative electrode of the secondary cell SC (for example, −3.8 V (when assuming positive electrode with 0 V)). When the voltage at the discharge control terminal DO1 is clamped to a voltage (for example, −15 V) that is higher than the voltage at the external negative terminal EB−(for example, −20 V (when assuming external positive terminal EB+ with 0 V)) by a predetermined voltage (for example, 5 V) under this state, a large voltage (for example, 11.2 V) is applied between the gate and the source of the discharge control FET 121. This means that when an FET having a withstand voltage of, for example, 6 V is used as the discharge control FET 121 as described above, a voltage exceeding the withstand voltage is applied between the gate and the source of the discharge control FET 121 under such a state, with the result that the discharge control FET 121 is damaged.

To avoid the state described above, a signal that is input to the output driver 113 from the detection control circuit 111 is also input to the enable terminal 114e of the clamp circuit 114 so that when a signal at the low level for turning off the charge control FET 122 is output from the detection control circuit 111 to the output driver 113, the clamp circuit 114 is disabled based on the fact that the signal at the low level is input to the enable terminal 114e.

Other configurations of the battery device capable of avoiding the state described above are described below as second and third embodiments of the present invention.

Figure 2:
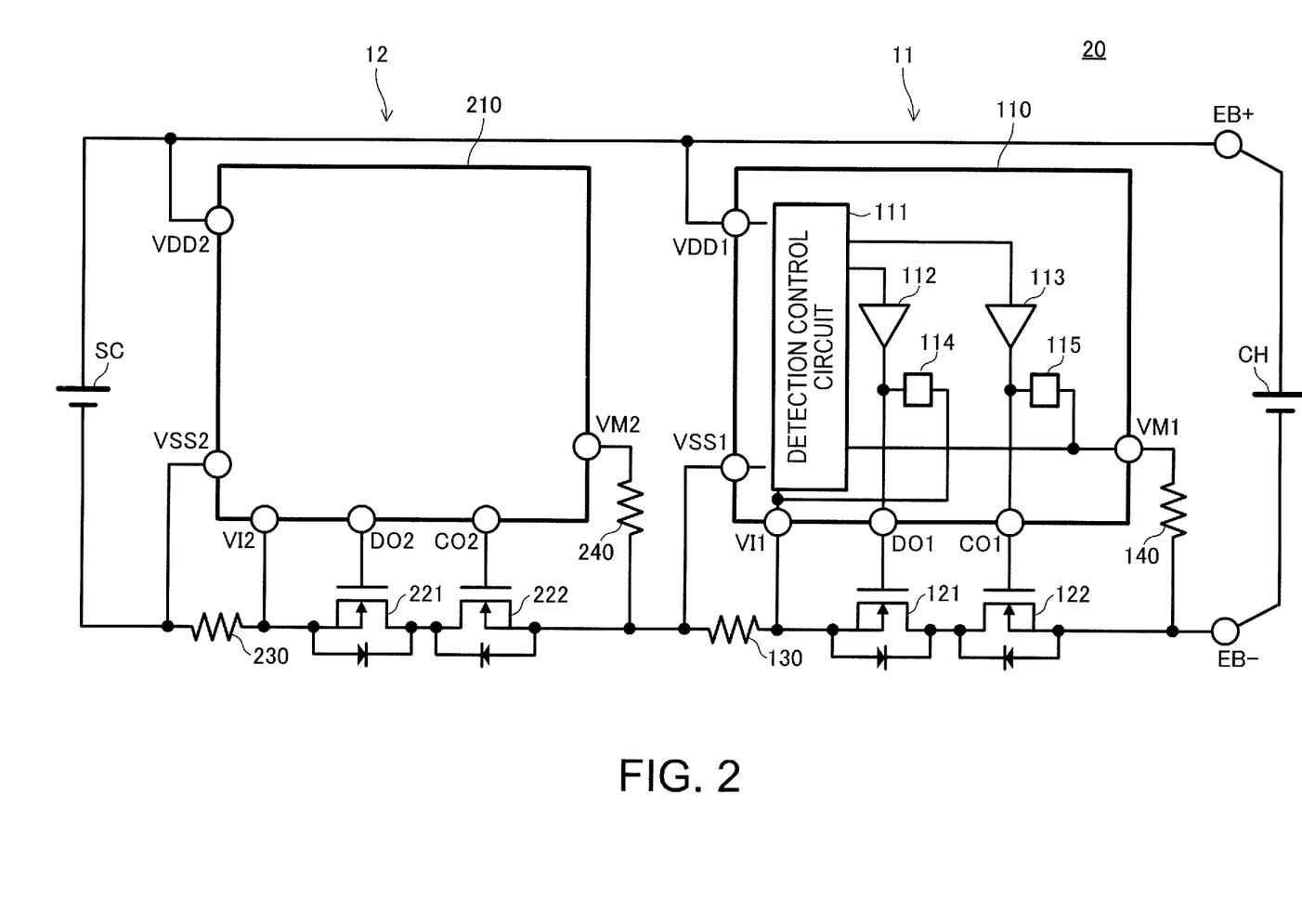
FIG. 2 is a block diagram for illustrating a battery device according to a second embodiment of the present invention.

FIG. 2 is a block diagram for illustrating a battery device 20 according to the second embodiment of the present invention.

The battery device 20 of the second embodiment differs from the battery device 10 of the first embodiment in that the clamp circuit 114 is connected not between the external negative voltage input terminal VM1 and the discharge control terminal DO1, but between the overcurrent detection terminal VI1 and the discharge control terminal DO1, and that the clamp circuit 114 does not have the enable terminal 114e.

The remaining configuration is the same as that of the battery device 10 illustrated in FIG. 1. The same components are therefore denoted by the same reference numerals and redundant description is omitted.

According to the battery device 20, the clamp circuit 114 clamps the voltage at the discharge control terminal DO1 to a voltage that is higher than the reference voltage by a predetermined voltage, with the reference voltage being the voltage at the overcurrent detection terminal VI1, namely, the voltage at the other end (source) of the discharge control FET 121. Thus, only the predetermined voltage is applied between the gate and the source of the discharge control FET 121 even when the first charge/discharge control device 11 detects overcharge or charge overcurrent and only the charge control FET 122 is thus turned off, under the state in which the charger CH is connected between the external positive terminal EB+ and the external negative terminal EB− and the charge control FETs 122 and 222 and the discharge control FETs 121 and 221 are all in the ON state.

With this configuration, according to the second embodiment, an FET having a low withstand voltage can be used as the discharge control FET 121 without provision of the enable terminal 114e.

Figure 3:
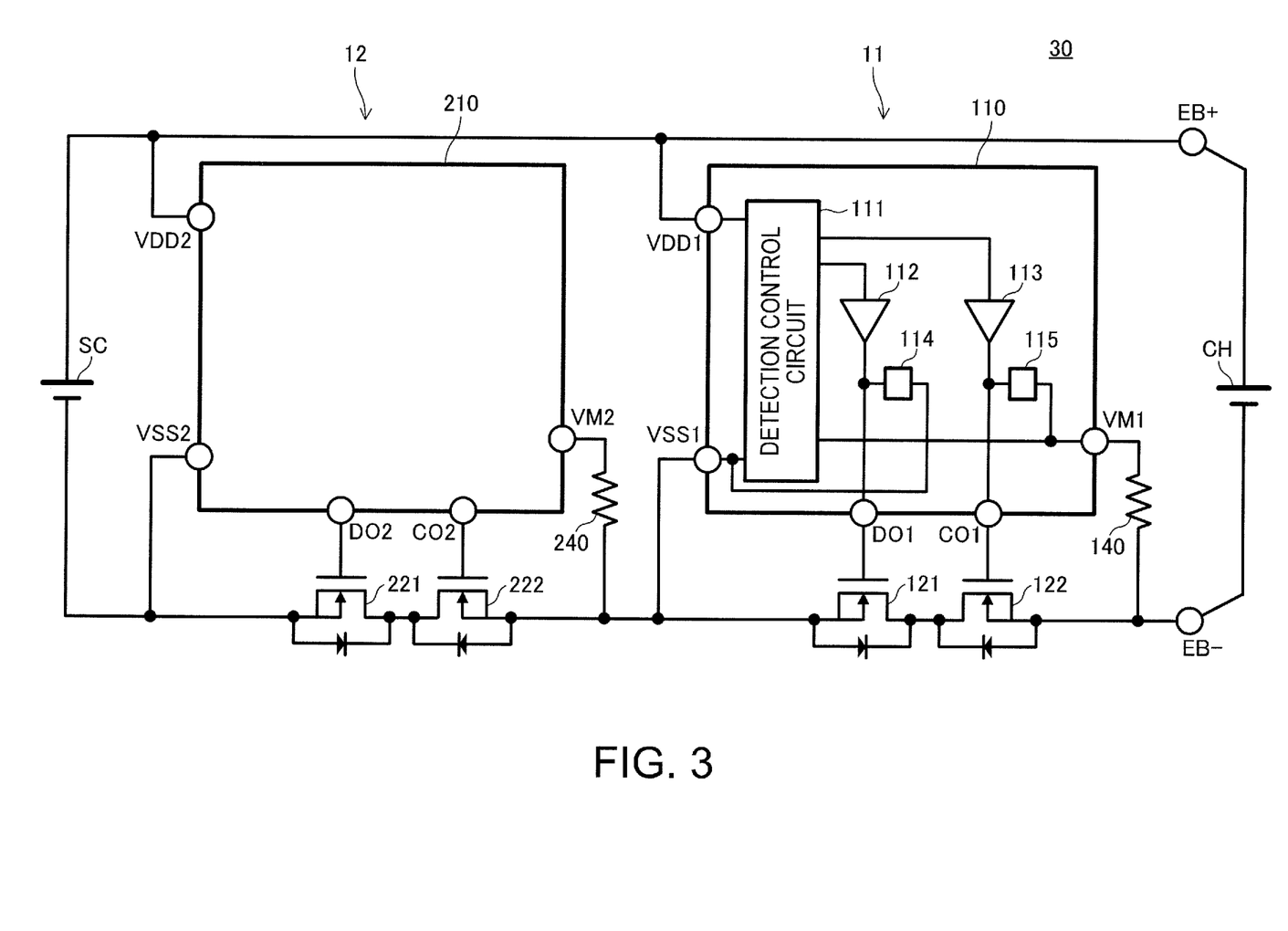
FIG. 3 is a block diagram for illustrating a battery device according to a third embodiment of the present invention.

FIG. 3 is a block diagram for illustrating a battery device 30 according to the third embodiment of the present invention.

The battery device 30 of the third embodiment differs from the battery device 10 of the first embodiment in that the clamp circuit 114 is connected not between the external negative voltage input terminal VM1 and the discharge control terminal DO1, but between the negative power supply terminal VSS1 and the discharge control terminal DO1, that the clamp circuit 114 does not have the enable terminal 114e, and that the battery device 30 includes neither the overcurrent detection resistors 130 and 230 nor the overcurrent detection terminals VI1 and VI2.

The remaining configuration is the same as that of the battery device 10 illustrated in FIG. 1. The same components are therefore denoted by the same reference numerals and redundant description is omitted.

The battery device 30 includes neither the overcurrent detection resistors 130 and 230 nor the overcurrent detection terminals VI1 and VI2 as described above. Thus, overcurrent is detected in the first charge/discharge control circuit 110 based on a difference between the voltage at the external negative voltage input terminal VM1 and the voltage at the negative power supply terminal VSS1, and overcurrent is detected in the second charge/discharge control circuit 210 based on a difference between a voltage at the external negative voltage input terminal VM2 and a voltage at the negative power supply terminal VSS2.

The clamp circuit 114 is connected between the negative power supply terminal VSS1 and the discharge control terminal DO1 because the overcurrent detection resistors 130 and 230 are not provided as described above.

According to the battery device 30, the clamp circuit 114 clamps the voltage at the discharge control terminal DO1 to a voltage that is higher than the reference voltage by a predetermined voltage, with the reference voltage being the voltage at the negative power supply terminal VSS1, namely, the voltage at the other end (source) of the discharge control FET 121 as in the battery device 20 illustrated in FIG. 2. Thus, only the predetermined voltage is applied between the gate and the source of the discharge control FET 121 even when only the charge control FET 122 is turned off under the state in which the charger CH is connected between the external positive terminal EB+ and the external negative terminal EB−.

With this configuration, also according to the third embodiment, an FET having a low withstand voltage can be used as the discharge control FET 121 without provision of the enable terminal 114e, as in the battery device 20 of the second embodiment.

As described above, according to the second and third embodiments, FETs having low withstand voltages can be used as the discharge control FET and the charge control FET that are controlled by the charger-side charge/discharge control circuit as in the first embodiment, without provision of the enable terminal 114e. As a result, an inexpensive and compact battery device can be provided.

In the battery device 20 illustrated in FIG. 2, when it is difficult to connect the clamp circuit 114 to the overcurrent detection terminal VI1 for reasons of wiring or the like, the clamp circuit 114 may be connected between the negative power supply terminal VSS1 and the discharge control terminal DO1 as in the battery device 30 illustrated in FIG. 3.

In the first to third embodiments, as the clamp circuits 114 and 115, for example, Zener diodes having the above-mentioned predetermined voltage as their breakdown voltage can be used. When such Zener diodes are used, the clamp circuits 114 and 115 operate only when the voltages between the external negative terminal EB−, and the output terminal of the output driver 112 and the output terminal of the output driver 113 exceed the breakdown voltage. The clamp circuits 114 and 115 are supplied with current only when operating and otherwise no current flows to the clamp circuits 114 and 115, which means that the current consumption does not unnecessarily increase.

However, it is difficult to integrate Zener diodes with other elements on a semiconductor substrate, and hence a plurality of impedance elements that are connected in series, for example, diode-connected MOS transistors that are connected in series are used as the clamp circuits 114 and 115 in some cases.

In this case, the clamp circuits 114 and 115 are always supplied with current, and hence the current consumption increases.

The battery device configured to solve this problem is described below as a fourth embodiment of the present invention.

Figure 4:
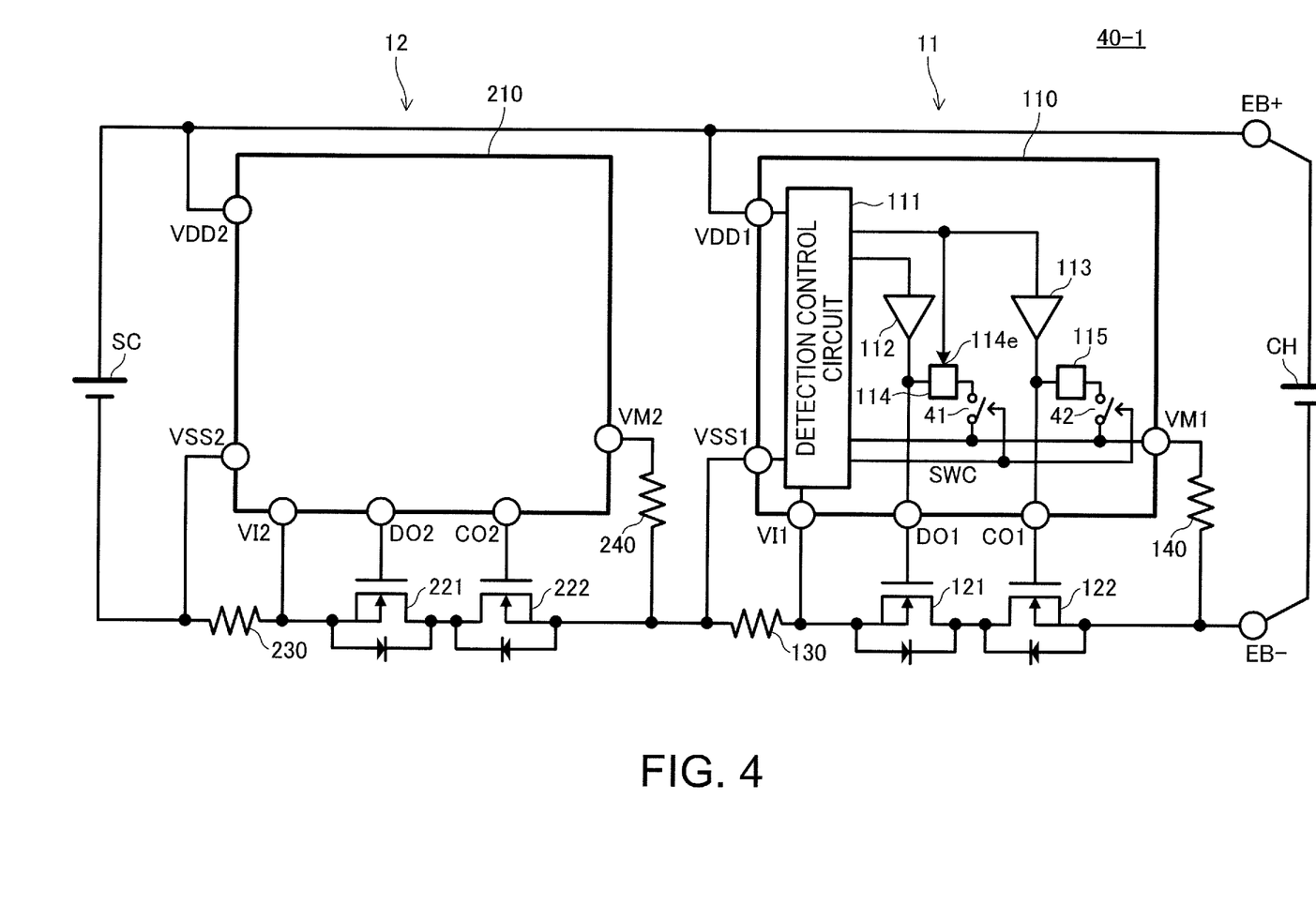
FIG. 4 is a block diagram for illustrating a battery device according to a fourth embodiment of the present invention.

FIG. 4 is a block diagram for illustrating a battery device 40-1 according to the fourth embodiment of the present invention.

The battery device 40-1 of the fourth embodiment differs from the battery device 10 of the first embodiment in the following configuration.

A switching element 41 is provided between the clamp circuit 114 and the external negative voltage input terminal VM1, and a switching element 42 is provided between the clamp circuit 115 and the external negative voltage input terminal VM1. In addition, the detection control circuit 111 is configured to output a switch control signal SWC to control the switching elements 41 and 42 to turn on and off.

The remaining configuration is the same as that of the battery device 10 illustrated in FIG. 1. The same components are therefore denoted by the same reference numerals and redundant description is omitted.

The operation of the battery device 40-1 is also almost the same as that of the battery device 10 of the first embodiment except for how the clamp circuits 114 and 115 operate and stop.

The detection control circuit 111 monitors the voltages at the positive power supply terminal VDD1 and the external negative voltage input terminal VM1 (external negative terminal EB−). When the detection control circuit 111 detects that a voltage between the positive power supply terminal VDD1 and the external negative voltage input terminal VM1 becomes a predetermined voltage that is higher than the voltage of the secondary cell SC, the detection control circuit 111 sets the switch control signal SWC to a first level, thereby turning on the switching elements 41 and 42. As a result, the clamp circuits 114 and 115 operate, thereby clamping the voltages at the discharge control terminal DO1 and the charge control terminal CO1 to a voltage that is higher than the voltage at the external negative voltage input terminal VM1 (voltage at external negative terminal EB−) which is the reference voltage, by a predetermined voltage.

Further, when detecting that the voltage between the positive power supply terminal VDD1 and the external negative voltage input terminal VM1 falls below the above-mentioned predetermined voltage, the detection control circuit 111 sets the switch control signal SWC to a second level, thereby turning off the switching elements 41 and 42. As a result, when there is no need to clamp the voltages at the discharge control terminal DO1 and the charge control terminal CO1, the operation of the clamp circuits 114 and 115 is stopped.

With this configuration, it is possible to prevent an unnecessary increase in current consumption.

As described above, also in the fourth embodiment, the effect similar to that of the first embodiment can be obtained, and the current consumption can be reduced.

Figure 5:
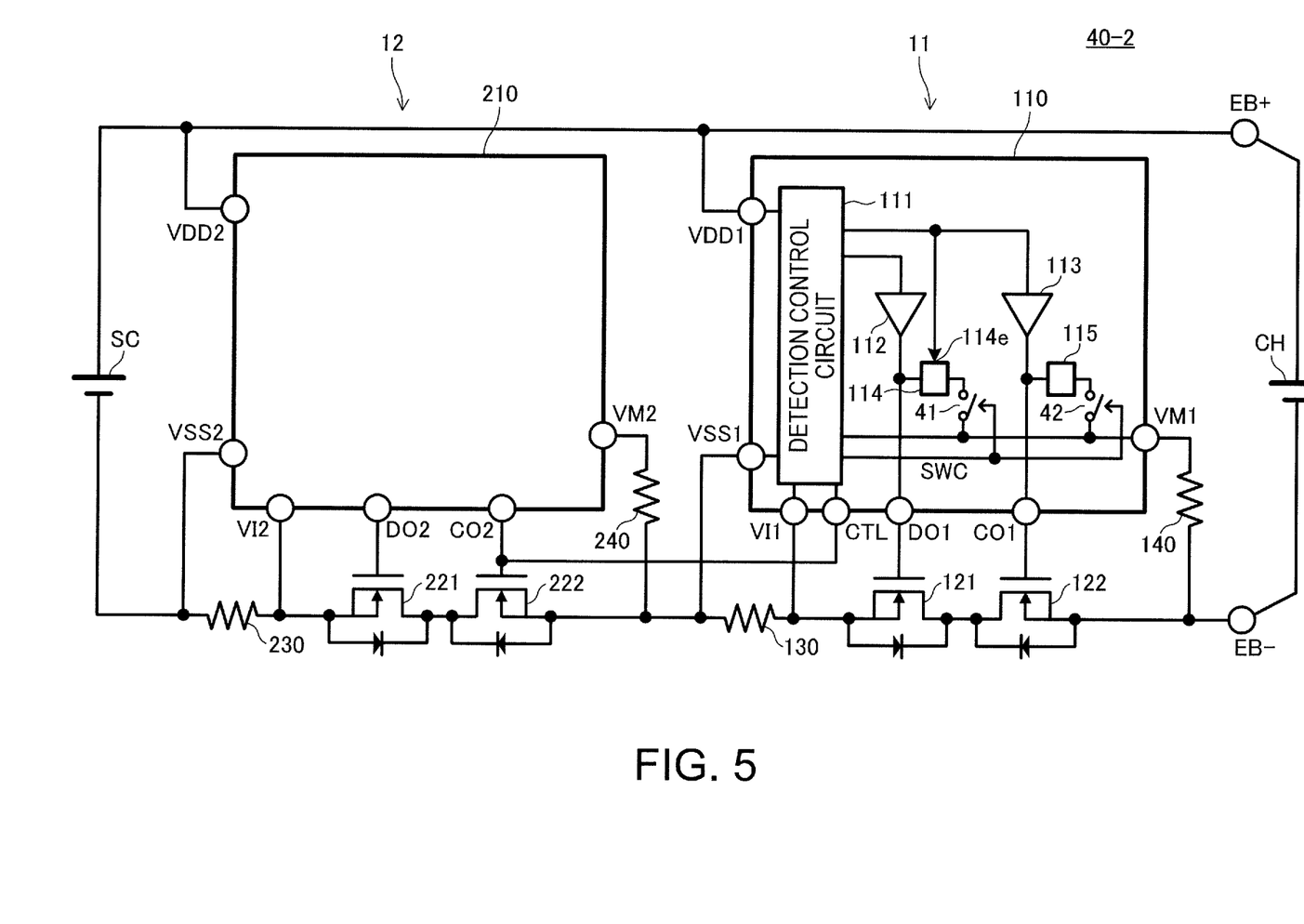
FIG. 5 is a block diagram for illustrating a battery device according to a second example of the fourth embodiment of the present invention.

FIG. 5 is a block diagram for illustrating a battery device 40-2 according to a second example of the fourth embodiment.

The battery device 40-2 differs from the battery device 40-1 illustrated in FIG. 4 in the following configuration. The configuration of the battery device 40-2 is the same as that of the battery device 40-1 of FIG. 4 except for the following points. The same components are therefore denoted by the same reference numerals and redundant description is omitted.

In the battery device 40-2, the first charge/discharge control circuit 110 further includes a control terminal CTL. The control terminal CTL is connected to the charge control terminal CO2 of the second charge/discharge control circuit 210. The switching elements 41 and 42 are turned on and off by the switch control signal SWC that is generated based on a signal input to the control terminal CTL.

When the charge control terminal CO2 outputs a signal at the high level, that is, when the charge control FET 222 is turned on, the switch control signal SWC becomes the second level. As a result, the switching elements 41 and 42 are turned off. This means that the operation of the clamp circuits 114 and 115 is stopped.

On the other hand, when the charge control terminal CO2 outputs a signal at the low level, that is, when the charge control FET 222 is turned off, the switch control signal SWC becomes the first level. As a result, the switching elements 41 and 42 are turned on. This means that the clamp circuits 114 and 115 operate, thereby clamping the voltages at the discharge control terminal DO1 and the charge control terminal CO1 to a voltage that is higher than the voltage at the external negative voltage input terminal VM1 (voltage at external negative terminal EB−) which is the reference voltage, by a predetermined voltage.

In the battery device 40-1 illustrated in FIG. 4, the detection control circuit 111 needs a circuit (not shown) configured to monitor the voltages at the positive power supply terminal VDD1 and the external negative voltage input terminal VM1, thereby detecting a voltage between the positive power supply terminal VDD1 and the external negative voltage input terminal VM1. Meanwhile, according to the battery device 40-2 of the second example, although one terminal needs to be added, there is no need to provide a circuit as described above, and the switching elements 41 and 42 can be controlled to turn on and off with a simple configuration.

Figure 6:
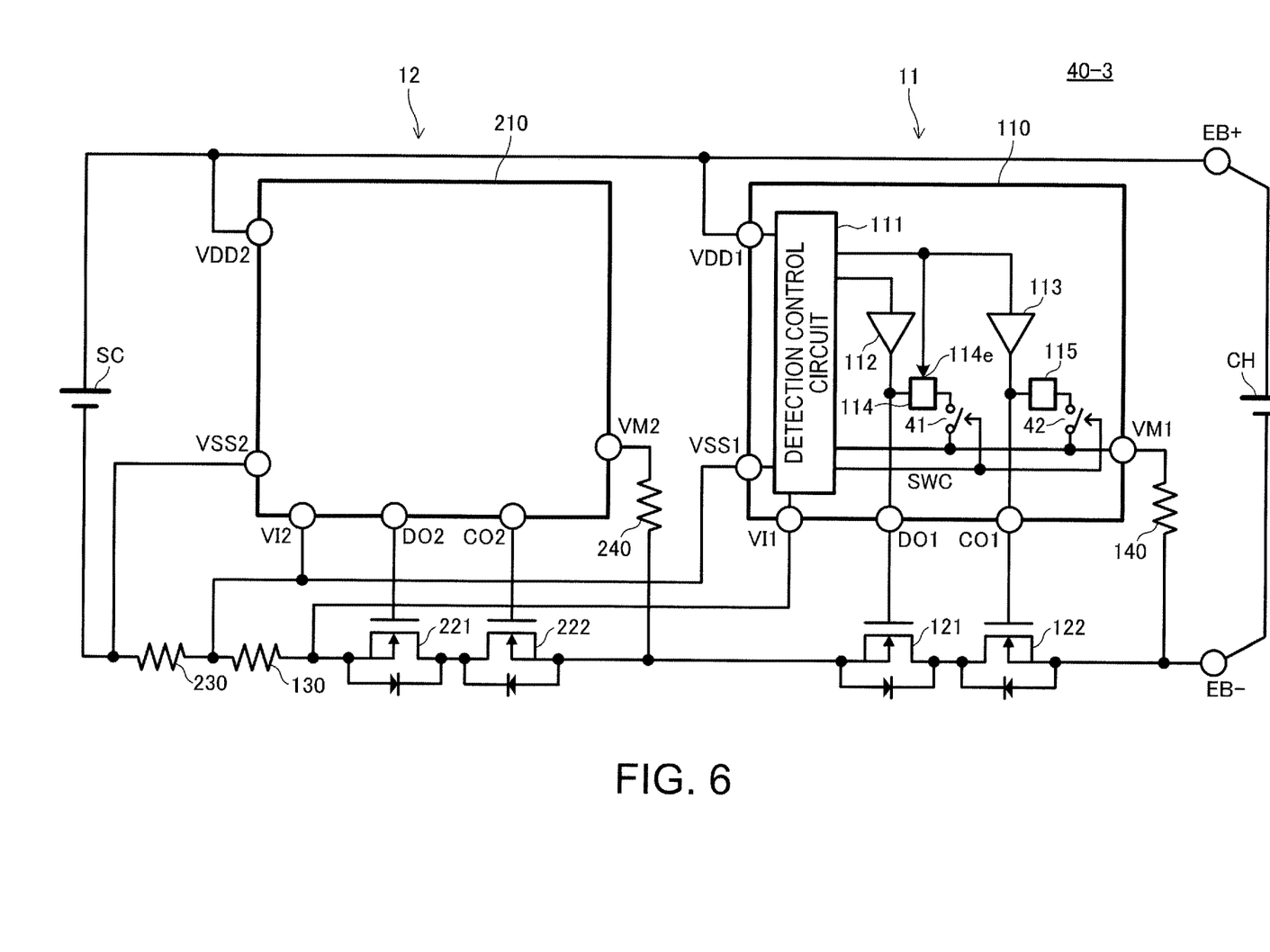
FIG. 6 is a block diagram for illustrating a battery device according to a third example of the fourth embodiment of the present invention.

FIG. 6 is a block diagram for illustrating a battery device 40-3 according to a third example of the fourth embodiment.

The battery device 40-3 differs from the battery device 40-1 illustrated in FIG. 4 in the following configuration. The configuration of the battery device 40-3 is the same as that of the battery device 40-1 of FIG. 4 except for the following points. The same components are therefore denoted by the same reference numerals and redundant description is omitted.

In the battery device 40-3, the overcurrent detection resistor 130 of the first charge/discharge control device 11 is connected not between the discharge control FET 121 and the charge control FET 222, but between the discharge control FET 221 and the overcurrent detection resistor 230.

According to the battery device 40-3 of the third example, even when the charge control FET 222 is turned off under the state in which the charger CH is connected, the voltage between the positive power supply terminal VDD1 and the negative power supply terminal VSS1 does not become the voltage of the charger CH but becomes the voltage of the secondary cell SC because the voltage at the negative power supply terminal VSS1 of the first charge/discharge control circuit 110 becomes the voltage at the negative electrode of the secondary cell SC. This means that the withstand voltage of the detection control circuit 111 can be reduced, and the first charge/discharge control circuit 110 can be manufactured at low cost.

In the third example, the detection control circuit 111 may be configured to monitor the voltage at the negative power supply terminal VSS1 or the overcurrent detection terminal VI1 and the voltage at the external negative voltage input terminal VM1, thereby detecting that the voltage between the positive power supply terminal VDD1 and the external negative terminal EB− becomes a predetermined voltage that is higher than the voltage of the secondary cell SC.

Figure 7:
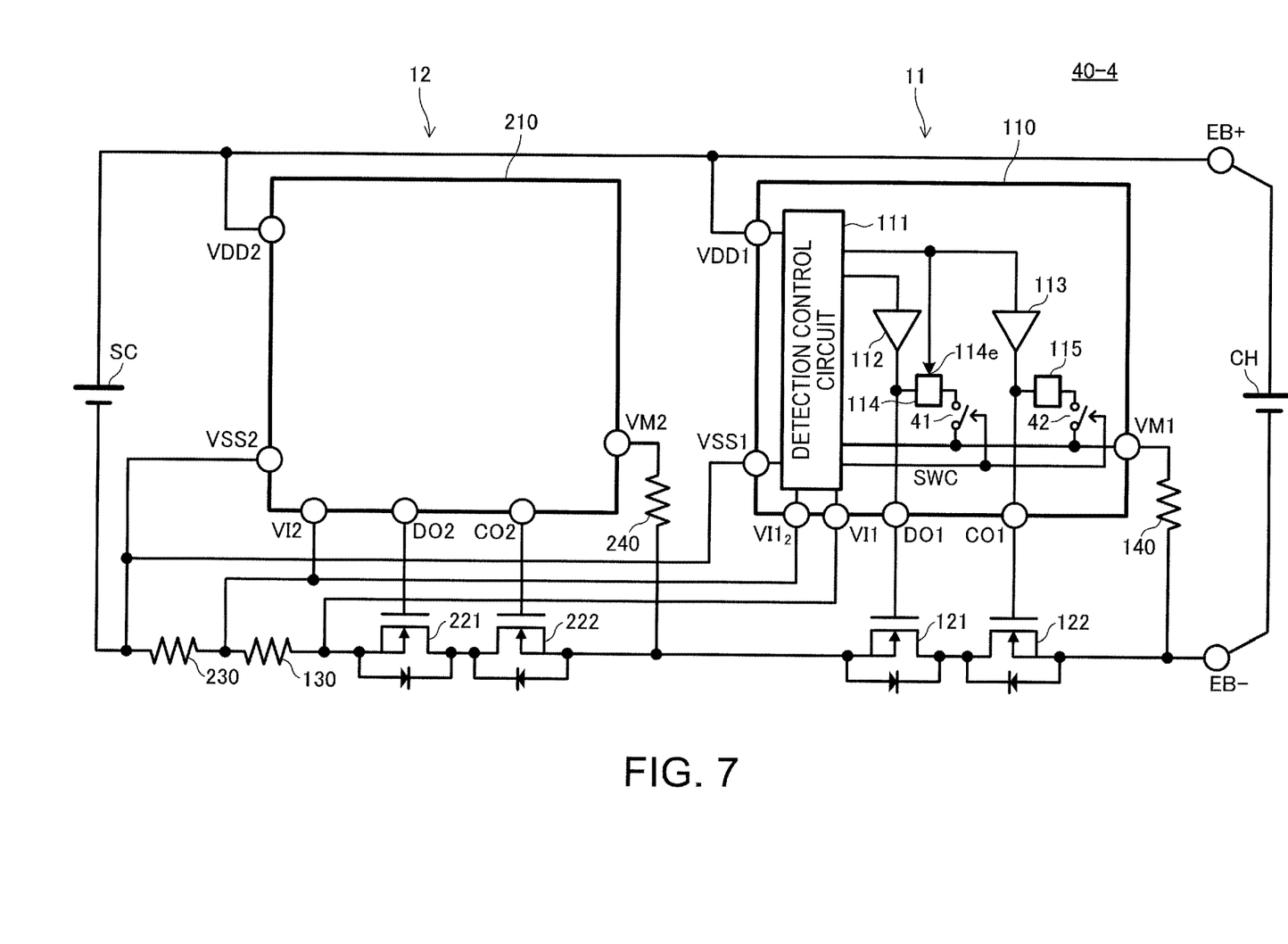
FIG. 7 is a block diagram for illustrating a battery device according to a fourth example of the fourth embodiment of the present invention.

FIG. 7 is a block diagram for illustrating a battery device 40-4 according to a fourth example of the fourth embodiment.

The battery device 40-4 differs from the battery device 40-3 illustrated in FIG. 6 in the following configuration. The configuration of the battery device 40-4 is the same as that of the battery device 40-3 of FIG. 6 except for the following points. The same components are therefore denoted by the same reference numerals and redundant description is omitted.

In the battery device 40-4, the first charge/discharge control circuit 110 further includes an overcurrent detection terminal VI1$_2$. The overcurrent detection terminal VI1$_2$ is connected to the node between the overcurrent detection resistor 130 and the overcurrent detection resistor 230. Further, the negative power supply terminal VSS1 of the first charge/discharge control circuit 110 is connected to the negative electrode of the secondary cell SC.

According to the battery device 40-4 of the fourth example, the negative power supply terminal VSS1 is directly connected to the negative electrode of the secondary cell SC without the overcurrent detection resistor 230, and hence the voltage of the secondary cell SC can be detected with high accuracy.

In the examples of the battery devices 40-1 to 40-4 according to the fourth embodiment, which are illustrated in FIG. 4 to FIG. 7, as in the battery device 10 of the first embodiment illustrated in FIG. 1, the reference voltage of the clamp circuits 114 and 115 is the voltage at the external negative voltage input terminal VM1, and the clamp circuit 114 includes the enable terminal 114e connected to the input terminal of the output driver 113. As a matter of course, however, those battery devices 40-1 to 40-4 can employ the configuration in which the clamp circuit 114 does not have the enable terminal 114e and the voltage at the overcurrent detection terminal VI1 or the negative power supply terminal VSS1 is used as the reference voltage of the clamp circuit 114, as in the battery devices 20 and 30 illustrated in FIG. 2 and FIG. 3.

The embodiments of the present invention have been described above, but the present invention is not limited to the above-mentioned embodiments, and it is to be understood that various modifications can be made thereto without departing from the gist of the present invention.

For example, in the examples of the battery devices 40-1, 40-3, and 40-4 illustrated in FIG. 4, FIG. 6, and FIG. 7, the switching elements 41 and 42 are controlled based on the voltage between the external negative voltage input terminal VM1 and the positive power supply terminal VDD1. However, the switching elements 41 and 42 may be controlled based on a voltage between a terminal other than the external negative voltage input terminal VM1 and the positive power supply terminal VDD1. The terminal other than the external negative voltage input terminal VM1 can be a terminal that takes the voltage at the negative electrode of the charger CH, namely, the voltage at the external negative terminal EB− when the charge control FET 222 is turned off.

Further, in the examples of the battery devices 10 and 40-1 to 40-4 illustrated in FIG. 1 and FIG. 4 to FIG. 7, the charge/discharge control circuit 110 includes the clamp circuit 114 between the discharge control terminal DO1 and the external negative voltage input terminal VM1, and the clamp circuit 115 between the charge control terminal CO1 and the external negative voltage input terminal VM1. However, only the gate-source voltage of the discharge control FET 121 may be clamped when the battery device is configured to turn off the charge control FET 122 when detecting that the charge control FET 222 is turned off. In other words, the charge/discharge control circuit 110 may only include the clamp circuit 114.

Further, in the above embodiments, the charge/discharge control device 11 includes the discharge control FET 121 and the charge control FET 122, and the charge/discharge control device 12 includes the discharge control FET 221 and the charge control FET 222. However, the charge/discharge control devices 11 and 12 may each include one bidirectional FET. Also in this case, the charge/discharge control device 11 may be configured so that the bidirectional FET connected to the charge/discharge control device 11 is protected by the clamp circuit when the bidirectional FET connected to the charge/discharge control device 12 is turned off.

What is claimed is:
1. A charge/discharge control circuit configured to control charging and discharging of a secondary cell, the charge/discharge control circuit comprising:
a positive power supply terminal and a negative power supply terminal for monitoring a voltage of the secondary cell;
a charge control terminal configured to connect to a gate of a charge control FET, the charge control FET having one end connected to an external negative terminal to which a negative electrode of a charger or a load is connected; and
a first clamp circuit configured to clamp a signal at a high level for turning on the charge control FET to a voltage that is higher than a first reference voltage by a predetermined voltage, the first reference voltage being a voltage at the external negative terminal, the signal at the high level for turning on the charge control FET being output to the charge control terminal.

2. The charge/discharge control circuit according to claim 1 further comprising:
  a discharge control terminal configured to connect to a gate of a discharge control FET having one end connected to the other end of the charge control FET; and
  a second clamp circuit configured to clamp a signal at a high level for turning on the discharge control FET to a voltage that is higher than a second reference voltage by a predetermined voltage, the second reference voltage being the voltage at the external negative terminal, the signal at the high level for turning on the discharge control FET being output to the discharge control terminal.

3. The charge/discharge control circuit according to claim 2, further comprising an external negative voltage input terminal configured to connect to the external negative terminal,
  wherein both the first reference voltage of the first clamp circuit and the second reference voltage of the second clamp circuit are a voltage that is input to the external negative voltage input terminal.

4. The charge/discharge control circuit according to claim 2, further comprising an overcurrent detection terminal configured to connect to the other end of the discharge control FET for detecting overcurrent of the secondary cell,
  wherein both the first reference voltage of the first clamp circuit and the second reference voltage of the second clamp circuit are a voltage that is input to the overcurrent detection terminal.

5. The charge/discharge control circuit according to claim 1 further comprising:
  a discharge control terminal configured to connect to a gate of a discharge control FET having one end connected to the other end of the charge control FET; and
  a second clamp circuit configured to clamp a signal at a high level for turning on the discharge control FET to a voltage that is higher than a second reference voltage by a predetermined voltage, the second reference voltage being a voltage at the other end of the discharge control FET, the signal at the high level for turning on the discharge control FET being output to the discharge control terminal.

6. The charge/discharge control circuit according to claim 5, further comprising:
  an external negative voltage input terminal configured to connect to the external negative terminal; and
  an overcurrent detection terminal configured to connect to the other end of the discharge control FET for detecting overcurrent of the secondary cell,
  wherein the first reference voltage of the first clamp circuit is a voltage that is input to the external negative voltage input terminal and the second reference voltage of the second clamp circuit is a voltage that is input to the overcurrent detection terminal.

7. The charge/discharge control circuit according to claim 5, further comprising an external negative voltage input terminal configured to connect to the external negative terminal,
  wherein the first reference voltage of the first clamp circuit is a voltage that is input to the external negative voltage input terminal and the second reference voltage of the second clamp circuit is a voltage that is input to the negative power supply terminal.

8. The charge/discharge control circuit according to claim 3,
  wherein the positive power supply terminal is connected to a positive electrode of the charger and the external negative voltage input terminal is connected to the negative electrode of the charger, and
  wherein the first clamp circuit and the second clamp circuit are configured to operate when a voltage between the positive power supply terminal and the external negative voltage input terminal becomes a predetermined voltage that is higher than the voltage of the secondary cell.

9. The charge/discharge control circuit according to claim 6,
  wherein the positive power supply terminal is connected to a positive electrode of the charger and the external negative voltage input terminal is connected to the negative electrode of the charger, and
  wherein the first clamp circuit and the second clamp circuit are configured to operate when a voltage between the positive power supply terminal and the external negative voltage input terminal becomes a predetermined voltage that is higher than the voltage of the secondary cell.

10. The charge/discharge control circuit according to claim 2, further comprising a control terminal configured to receive a signal for controlling operation of the first clamp circuit and operation of the second clamp circuit,
  wherein the operation of the first clamp circuit and the operation of the second clamp circuit are stopped when the signal at the control terminal is at a high level.

11. The charge/discharge control circuit according to claim 5, further comprising a control terminal configured to receive a signal for controlling operation of the first clamp circuit and operation of the second clamp circuit,
  wherein the operation of the first clamp circuit and the operation of the second clamp circuit are stopped when the signal at the control terminal is at a high level.

12. A battery device, comprising:
  a secondary cell;
  an external positive terminal and an external negative terminal to which a load and a charger are connected;
  a first charge/discharge control circuit and a second charge/discharge control circuit connected to the secondary cell;
  a first charge control FET having one end connected to the external negative terminal;
  a first discharge control FET having one end connected to the other end of the first charge control FET;
  a second charge control FET having one end connected to the other end of the first discharge control FET; and
  a second discharge control FET having one end connected to the other end of the second charge control FET and the other end connected to a negative electrode of the secondary cell,
  the first charge/discharge control circuit including:
    a positive power supply terminal and a negative power supply terminal for monitoring a voltage of the secondary cell;
    a charge control terminal connected to a gate of the first charge control FET; and
    a first clamp circuit configured to clamp a signal at a high level for turning on the charge control FET to a voltage that is higher than a first reference voltage by a predetermined voltage, the first reference voltage being a voltage at the external negative terminal, the signal at the high level for turning on the first charge control FET being output to the charge control terminal.

13. The battery device according to claim 12, wherein the first charge/discharge control circuit further including:
 a discharge control terminal connected to a gate of the first discharge control FET; and
 a second clamp circuit configured to clamp a signal at a high level for turning on the first discharge control FET to a voltage that is higher than a second reference voltage by a predetermined voltage, the second reference voltage being the voltage at the external negative terminal, the signal at the high level for turning on the first discharge control FET being output to the discharge control terminal.

14. The battery device according to claim 13,
 wherein the first charge/discharge control circuit further includes an external negative voltage input terminal connected to the external negative terminal, and
 wherein both the first reference voltage of the first clamp circuit and the second reference voltage of the second clamp circuit are a voltage that is input to the external negative voltage input terminal.

15. The battery device according to claim 13,
 wherein the first charge/discharge control circuit further includes an overcurrent detection terminal connected to the other end of the first discharge control FET for detecting overcurrent of the secondary cell, and
 wherein both the first reference voltage of the first clamp circuit and the second reference voltage of the second clamp circuit are a voltage that is input to the overcurrent detection terminal.

16. The battery device according to claim 12, wherein the first charge/discharge control circuit further includes:
 a discharge control terminal connected to a gate of the first discharge control FET; and
 a second clamp circuit configured to clamp a signal at a high level for turning on the first discharge control FET to a voltage that is higher than a second reference voltage by a predetermined voltage, the second reference voltage being a voltage at the other end of the first discharge control FET, the signal at the high level for turning on the first discharge control FET being output to the discharge control terminal.

17. The battery device according to claim 16,
 wherein the first charge/discharge control circuit further includes:
 an external negative voltage input terminal connected to the external negative terminal; and
 an overcurrent detection terminal connected to the other end of the first discharge control FET for detecting overcurrent of the secondary cell,
 wherein the first reference voltage of the first clamp circuit is a voltage that is input to the external negative voltage input terminal and the second reference voltage of the second clamp circuit is a voltage that is input to the overcurrent detection terminal.

18. The battery device according to claim 16,
 wherein the first charge/discharge control circuit further includes an external negative voltage input terminal connected to the external negative terminal,
 wherein the first reference voltage of the first clamp circuit is a voltage that is input to the external negative voltage input terminal and the second reference voltage of the second clamp circuit is a voltage that is input to the negative power supply terminal.

19. The battery device according to claim 14,
 wherein the positive power supply terminal is connected to a positive electrode of the charger and the external negative voltage input terminal is connected to the negative electrode of the charger, and
 wherein the first clamp circuit and the second clamp circuit are configured to operate when a voltage between the positive power supply terminal and the external voltage input terminal becomes a predetermined voltage that is higher than the voltage of the secondary cell.

20. The battery device according to claim 17,
 wherein the positive power supply terminal is connected to a positive electrode of the charger and the external negative voltage input terminal is connected to the negative electrode of the charger, and
 wherein the first clamp circuit and the second clamp circuit are configured to operate when a voltage between the positive power supply terminal and the external voltage input terminal becomes a predetermined voltage that is higher than the voltage of the secondary cell.

21. The battery device according to claim 13,
 wherein the first charge/discharge control circuit further includes a control terminal connected to a gate of the second charge control FET, and
 wherein operation of the first clamp circuit and operation of the second clamp circuit are stopped when a signal at the control terminal is at a high level.

22. The battery device according to claim 16,
 wherein the first charge/discharge control circuit further includes a control terminal connected to a gate of the second charge control FET, and
 wherein operation of the first clamp circuit and operation of the second clamp circuit are stopped when a signal at the control terminal is at a high level.

23. The battery device according to claim 12, further comprising:
 a first overcurrent detection resistor has one end connected to the other end of the second discharge control FET; and
 a second overcurrent detection resistor has one end connected to the other end of the first overcurrent detection resistor and the other end connected to the negative electrode of the secondary cell,
 wherein the first charge/discharge control circuit further includes an overcurrent detection terminal for detecting overcurrent of the secondary cell, and
 wherein the overcurrent detection terminal is connected to the one end of the first overcurrent detection resistor, and the negative power supply terminal is connected to the other end of the first overcurrent detection resistor.

24. The battery device according to claim 13, further comprising:
 a first overcurrent detection resistor has one end connected to the other end of the second discharge control FET; and
 a second overcurrent detection resistor has one end connected to the other end of the first overcurrent detection resistor and the other end connected to the negative electrode of the secondary cell,
 wherein the first charge/discharge control circuit further includes an overcurrent detection terminal for detecting overcurrent of the secondary cell, and
 wherein the overcurrent detection terminal is connected to the one end of the first overcurrent detection resistor, and the negative power supply terminal is connected to the other end of the first overcurrent detection resistor.

25. The battery device according to claim 14, further comprising:
  a first overcurrent detection resistor has one end connected to the other end of the second discharge control FET; and
  a second overcurrent detection resistor has one end connected to the other end of the first overcurrent detection resistor and the other end connected to the negative electrode of the secondary cell,
  wherein the first charge/discharge control circuit further includes an overcurrent detection terminal for detecting overcurrent of the secondary cell, and
  wherein the overcurrent detection terminal is connected to the one end of the first overcurrent detection resistor, and the negative power supply terminal is connected to the other end of the first overcurrent detection resistor.

26. The battery device according to claim 16, further comprising:
  a first overcurrent detection resistor has one end connected to the other end of the second discharge control FET; and
  a second overcurrent detection resistor has one end connected to the other end of the first overcurrent detection resistor and the other end connected to the negative electrode of the secondary cell,
  wherein the first charge/discharge control circuit further includes an overcurrent detection terminal for detecting overcurrent of the secondary cell, and
  wherein the overcurrent detection terminal is connected to the one end of the first overcurrent detection resistor, and the negative power supply terminal is connected to the other end of the first overcurrent detection resistor.

27. The battery device according to claim 18, further comprising:
  a first overcurrent detection resistor has one end connected to the other end of the second discharge control FET; and
  a second overcurrent detection resistor has one end connected to the other end of the first overcurrent detection resistor and the other end connected to the negative electrode of the secondary cell,
  wherein the first charge/discharge control circuit further includes an overcurrent detection terminal for detecting overcurrent of the secondary cell, and
  wherein the overcurrent detection terminal is connected to the one end of the first overcurrent detection resistor, and the negative power supply terminal is connected to the other end of the first overcurrent detection resistor.

28. The battery device according to claim 12, further comprising:
  a first overcurrent detection resistor has one end connected to the other end of the second discharge control FET; and
  a second overcurrent detection resistor has one end connected to other end of the first overcurrent detection resistor, and the other end connected to the negative electrode of the secondary cell,
  wherein the first charge/discharge control circuit further comprises a first overcurrent detection terminal and a second overcurrent detection terminal for detecting overcurrent of the secondary cell, and
  wherein the first overcurrent detection terminal is connected to the one end of the first overcurrent detection resistor, the second overcurrent detection terminal is connected to the other end of the first overcurrent detection resistor, and the negative power supply terminal is connected to the negative electrode of the secondary cell.

29. The battery device according to claim 13, further comprising:
  a first overcurrent detection resistor has one end connected to the other end of the second discharge control FET; and
  a second overcurrent detection resistor has one end connected to other end of the first overcurrent detection resistor, and the other end connected to the negative electrode of the secondary cell,
  wherein the first charge/discharge control circuit further comprises a first overcurrent detection terminal and a second overcurrent detection terminal for detecting overcurrent of the secondary cell, and
  wherein the first overcurrent detection terminal is connected to the one end of the first overcurrent detection resistor, the second overcurrent detection terminal is connected to the other end of the first overcurrent detection resistor, and the negative power supply terminal is connected to the negative electrode of the secondary cell.

30. The battery device according to claim 14, further comprising:
  a first overcurrent detection resistor has one end connected to the other end of the second discharge control FET; and
  a second overcurrent detection resistor has one end connected to other end of the first overcurrent detection resistor, and the other end connected to the negative electrode of the secondary cell,
  wherein the first charge/discharge control circuit further comprises a first overcurrent detection terminal and a second overcurrent detection terminal for detecting overcurrent of the secondary cell, and
  wherein the first overcurrent detection terminal is connected to the one end of the first overcurrent detection resistor, the second overcurrent detection terminal is connected to the other end of the first overcurrent detection resistor, and the negative power supply terminal is connected to the negative electrode of the secondary cell.

31. The battery device according to claim 16, further comprising:
  a first overcurrent detection resistor has one end connected to the other end of the second discharge control FET; and
  a second overcurrent detection resistor has one end connected to other end of the first overcurrent detection resistor, and the other end connected to the negative electrode of the secondary cell,
  wherein the first charge/discharge control circuit further comprises a first overcurrent detection terminal and a second overcurrent detection terminal for detecting overcurrent of the secondary cell, and
  wherein the first overcurrent detection terminal is connected to the one end of the first overcurrent detection resistor, the second overcurrent detection terminal is connected to the other end of the first overcurrent detection resistor, and the negative power supply terminal is connected to the negative electrode of the secondary cell.

32. The battery device according to claim 18, further comprising:
- a first overcurrent detection resistor has one end connected to the other end of the second discharge control FET; and
- a second overcurrent detection resistor has one end connected to other end of the first overcurrent detection resistor, and the other end connected to the negative electrode of the secondary cell,
- wherein the first charge/discharge control circuit further comprises a first overcurrent detection terminal and a second overcurrent detection terminal for detecting overcurrent of the secondary cell, and
- wherein the first overcurrent detection terminal is connected to the one end of the first overcurrent detection resistor, the second overcurrent detection terminal is connected to the other end of the first overcurrent detection resistor, and the negative power supply terminal is connected to the negative electrode of the secondary cell.

* * * * *